United States Patent [19]

Ehrlich

[11] Patent Number: 5,536,036
[45] Date of Patent: Jul. 16, 1996

[54] LOCKING MECHANISM FOR AIR SUSPENSION

[75] Inventor: Rodney P. Ehrlich, Monticello, Ind.

[73] Assignee: Wabash National Corporation, Lafayette, Ind.

[21] Appl. No.: 406,497

[22] Filed: Mar. 20, 1995

[51] Int. Cl.$^6$ ................................................. B60G 11/26
[52] U.S. Cl. ................................................. 280/711; 280/702
[58] Field of Search ...................... 280/702, 6.12, 280/81.1, DIG. 1, 711, 704, 713; 180/209; 267/234, 242

[56] References Cited

U.S. PATENT DOCUMENTS

| | | | |
|---|---|---|---|
| Re. 32,736 | 8/1988 | Lovell | 280/702 |
| 3,883,153 | 5/1975 | Singh et al. | 280/688 |
| 4,145,073 | 3/1979 | McLuckie et al. | 280/702 |
| 4,279,319 | 7/1981 | Joyce | 280/6.12 |
| 5,018,755 | 5/1991 | McNeilus et al. | 280/711 |
| 5,058,917 | 10/1991 | Richardson | 280/704 |
| 5,192,101 | 3/1993 | Richardson | 280/711 |

*Primary Examiner*—Paul N. Dickson
*Attorney, Agent, or Firm*—Trexler, Bushnell, Giangiorgi & Blackstone, Ltd.

[57] ABSTRACT

An air suspension system on a van-type trailer includes a mechanism for mechanically locking the system when the van is parked. The air suspension includes a wheel axle which is supported at an end of a cantilevered arm with the opposite end of the arm rotatable about a pivot on the vehicle frame. An air bag is positioned between the arm and the frame for permitting relative up-and-down movement during transportation of the van. The locking mechanism is a fixed strut which is engaged between the frame and the axle to lock the frame and the axle against relative up-and-down movement by fixing the distance between the frame and the axle. In a first embodiment, the strut is rotatable to move the strut into a retracted position to enable relative up-and-down movement during transportation of the van. In a second embodiment, the strut is a double-acting hydraulic cylinder which replaces the shock absorber normally found on a trailer. A valve is connected to the cylinder and is movable from a first position which allows the cylinder to move upwardly and downwardly thereby allowing relative up-and-down movement between the frame and the axle, to a second position when the vehicle is parked which prevents the cylinder from moving upwardly and downwardly thereby preventing the frame and the axle from moving in a relative up-and-down movement.

12 Claims, 2 Drawing Sheets

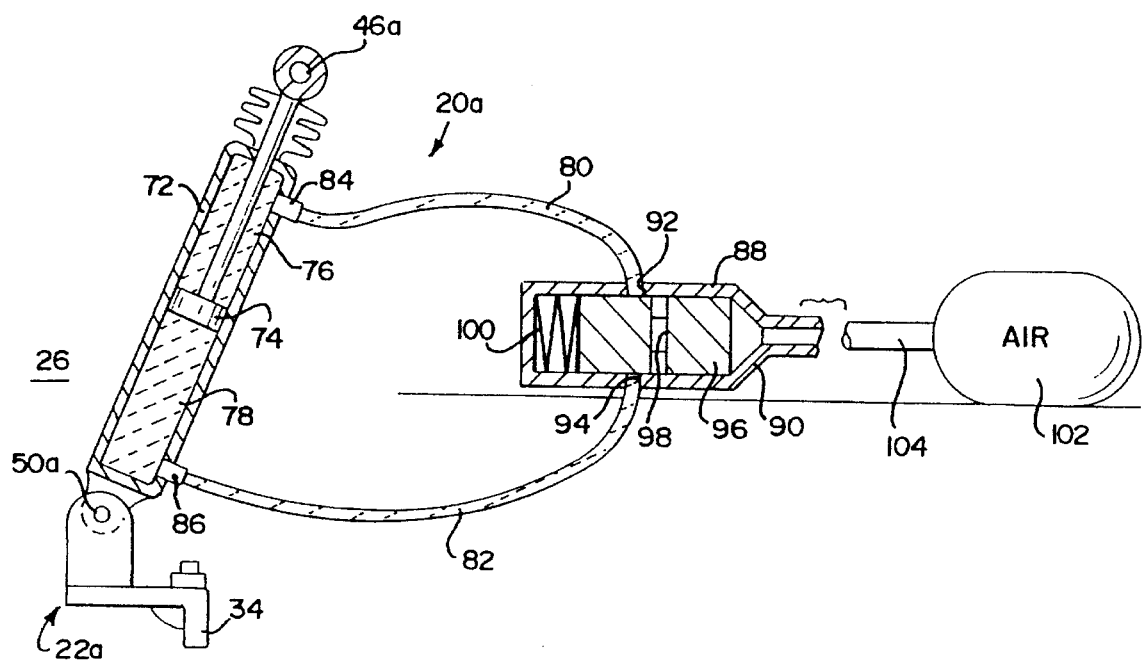
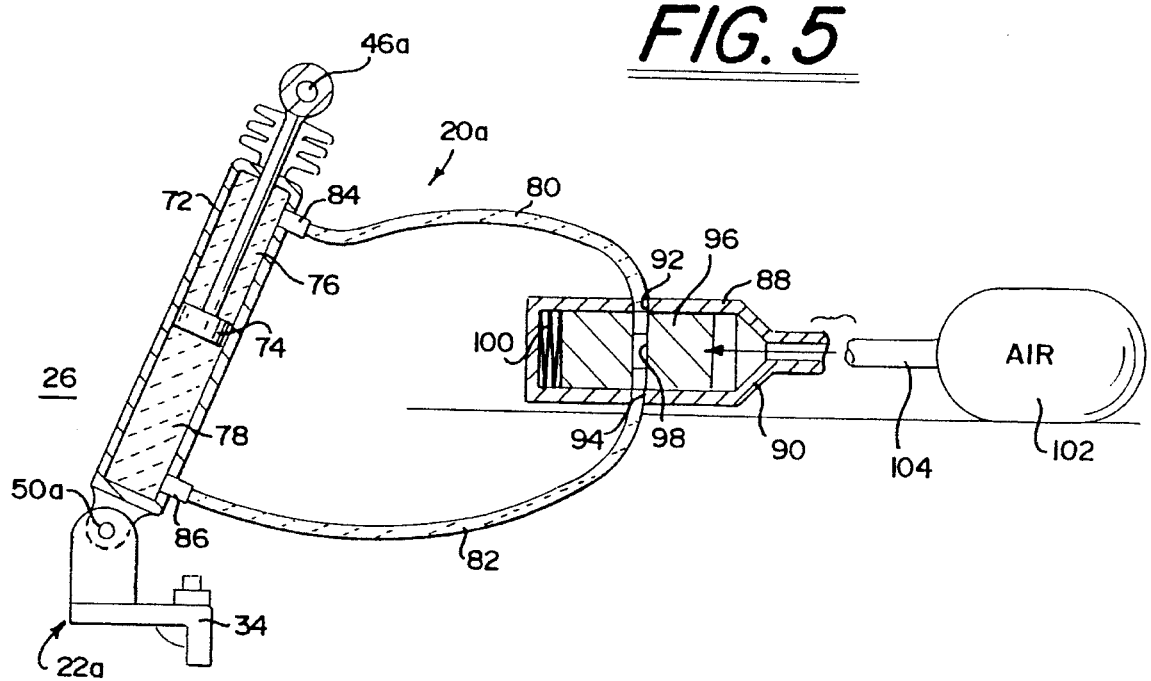

LOCKING MECHANISM FOR AIR SUSPENSION

BACKGROUND OF THE INVENTION

This invention is generally directed to a mechanism for mechanically locking an air suspension system in a van-type trailer. More particularly, the invention contemplates a mechanism for locking the air suspension system to prevent up-and-down movement between the vehicle frame and the wheels of the van when a van is being loaded or unloaded at a loading dock.

This invention is intended to solve problems which arise when loading a van-type trailer having an air suspension. In general, such a suspension includes a wheel axle supported at the end of a cantilevered lever or arm having its opposite end rotatable about a fixed pivot. An air bag is located between the van frame and the axle for permitting the desired spring action. A tank of compressed air is provided on the van frame and a valve is connected between the tank and the air bag so as to adjust the pressure in the air bag for supporting the weight of the van and its load and more specifically, for substantially maintaining a predetermined spacing between the van frame and the axle, at least when the van is stationary or not subjected to road shocks.

When a van is to be loaded or unloaded, the trailer is backed against a loading dock which is generally level with the floor of the van. A board or "bridge" is put down between the loading dock and the floor of the van so that a fork-lift truck may be driven into and out of the van. When the front wheels of the fork-lift truck first move from the loading dock onto the back end of the van floor, a heavy load is suddenly placed on the air suspension which, for example, might be on the order of 30,000 pounds, and as a result the back end of the van will move downward suddenly as the air bags flatten. This causes the pivoted axle supporting arm to rotate about the pivot point in a clockwise direction. Since it is the general practice, if not the law, that the wheel be locked by a brake when the vehicle is parked for loading and unloading, the tire will also rotate around the pivot point in a clockwise direction which tends to force the trailer forwardly away from the loading dock as much as several inches. As a result, the board or "bridge" may fall out from between the dock and the van and the rear wheels of the fork-lift truck may fall into the gap between the loading dock and the van.

When the van is backed against the dock, the dock is routinely provided with a latch member that reaches out and engages beneath the back bumper of the trailer. If the trailer moves forward as mentioned above, the latch member engaging the bumper may cause the bumper to be pulled backwardly and bent. Furthermore, when the trailer body moves downwardly, the bumper may be forced downwardly onto the latch member which tries to support the weight of the van whereby the bumper may be bent and/or the latch member may be bent or broken.

If the fork-lift truck successfully enters the van, movement of the fork-lift truck toward the front end of the van for either loading or unloading, will shift the weight forwardly of the air suspension so that the air pressure in the bags which has been increased after the initial downward deflection sufficiently to again raise the bed of the trailer to the desired level, functions suddenly to raise the back end of the trailer further. This causes the suspension lever arm to pivot in a counter-clockwise direction along with a corresponding counter-clockwise movement of the tire. Since the tire is essentially unloaded, however, it tends to slip over the ground rather than to drive the trailer. In other words, the trailer will remain in the advanced position to which it has been pushed. As will be appreciated, repeated trips of the fork-lift truck into and out of the van will cause the trailer to "ratchet" forward. It will also cause repeated charging of the air bags and venting of the air bags until the compressed air in the accumulator is exhausted.

The present invention solves all of the above problems by providing a mechanism for mechanically locking the air suspension in the desired position when the van is first moved against the loading dock and parked. In general, a stiff leg or strut of fixed length is connected between the wheel axle and the van frame so as to prevent the air bag from either expanding or collapsing.

OBJECTS AND SUMMARY OF THE INVENTION

A general object of the present invention is to provide a locking mechanism for a van-type trailer which prevents relative up-and-down movement between a van frame and a wheel axle of the trailer when the vehicle is parked but does not interfere with relative up-and-down movement between the frame and the axle during transportation of the van.

An object of the present invention is to provide a locking mechanism which allows a trailer to be loaded safely at a loading dock.

Another object of the present invention is to provide a locking mechanism which prevents damage to a trailer or a latch attached to the trailer while the trailer is parked and being loaded at a loading dock.

Briefly, and in accordance with the foregoing, the present invention discloses a suspension system for a van-type trailer which has a locking mechanism thereon. The suspension system includes a cantilevered arm or other known wheel axle support. An air bag or other known spring means permits relative up-and-down movement between the axle and the frame during transportation of the van.

An air suspension used with a first embodiment of the locking mechanism includes a conventional vehicle shock absorber. A latch member is provided on the cantilevered arm. The locking mechanism of the first embodiment includes a fixed length, rigid member which has a first end pivotally connected to the vehicle frame and a second, hook-shaped end which can be engaged with an abutment surface associated with the axle or cantilevered arm and the latch member on the axle or cantilevered arm. The member is rotatable around the pivot to move the member from a retracted position whereby the vehicle frame and the axle are able to move in a relative up-and-down movement during transportation of the van, to an extended or engaged position, with the latch engaging the cantilevered arm when the van is parked whereby the frame and the axle are locked and are unable to move in a relative up-and-down movement.

Normally, the member is kept in an extended or engaged position by a spring having one end attached to the vehicle frame and the other end attached to the first end of the member. An air cylinder and an associated piston arm member which is connected between the air cylinder and the first end of the member is provided in the structure. To retract the strut, air is supplied to the air cylinder which moves the piston arm member to an extended position to overpower the spring and to move the strut to a retracted position.

A second embodiment of the rigid strut disclosed herein is a double-acting hydraulic cylinder and piston which replaces the vehicle shock absorber. In the second embodiment, the hook-shaped member, the air cylinder, the spring and the latch on the cantilevered arm are eliminated. The hydraulic cylinder is positioned between the vehicle frame and the wheel axle. A valve is connected to the hydraulic cylinder by connection members or hydraulic lines which are connected to each end of the cylinder. The valve is movable to a first position during transportation of the van which allows the cylinder to move upwardly and downwardly by allowing hydraulic fluid to flow from one end of the cylinder, through the valve and to the other end of the cylinder. In this position, the double-acting hydraulic cylinder and piston act as a shock absorber and the frame and the wheel axle are able to move in a relative up-and-down movement during transportation. The valve is movable to a second position when the van is parked which prevents the hydraulic fluid from flowing through the valve and locks the fluid in the cylinder. The cylinder cannot extend and retract and instead becomes a rigid strut. Thus, the vehicle frame and the wheel axle cannot move in a relative up-and-down movement.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 4 is a side elevational view of a second embodiment of a locking mechanism which incorporates the features of the invention with the locking mechanism in a retracted position; and FIG. 5 is a side elevational view of the locking mechanism shown in FIG. 4 with the locking mechanism in a locked position.

DETAILED DESCRIPTION OF THE PREFERRED EMBODIMENT

Figure 1:
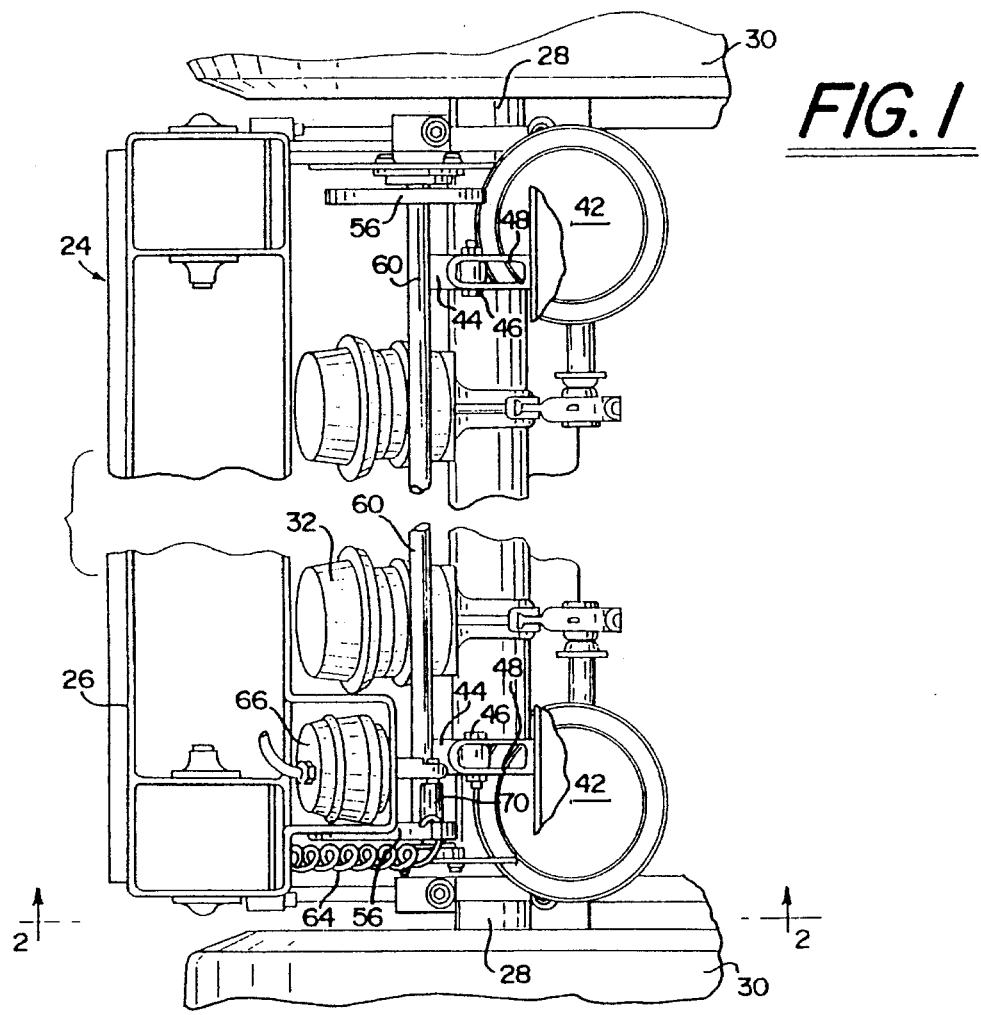
FIG. 1 is a top view of a first embodiment of a locking mechanism for an air suspension system in a van-type trailer which incorporates the features of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
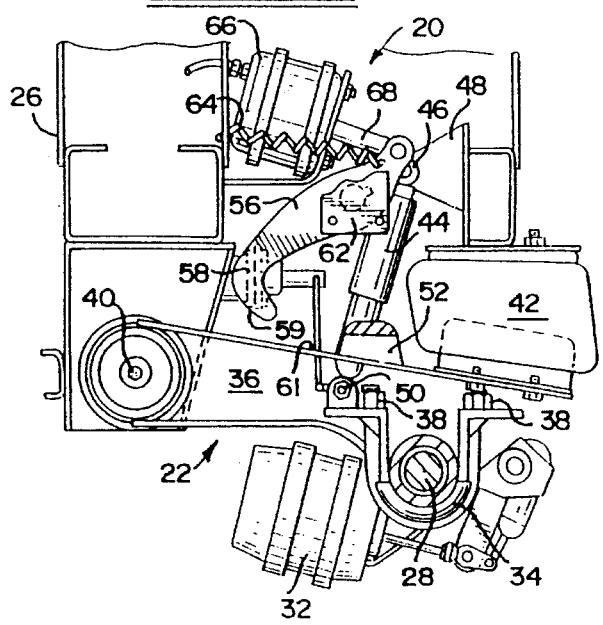
FIG. 2 is a side elevational view of the locking mechanism shown in FIG. 1, along line 2—2, with the locking mechanism in a retracted position.
Figure 3:
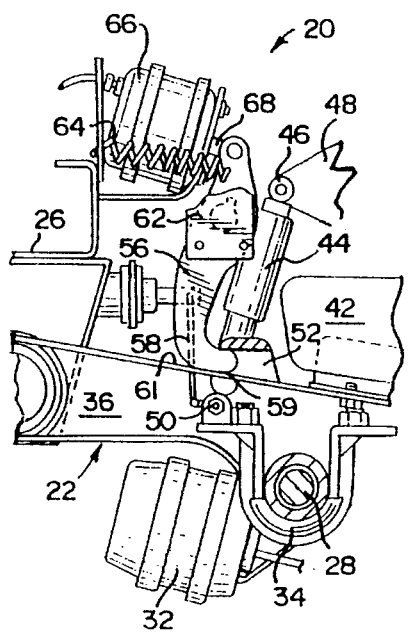
FIG. 3 is a side elevational view of the locking mechanism shown in FIG. 2 with the locking mechanism in a locked position.

A locking mechanism 20, 20a, a first embodiment of which is shown in FIGS. 1–3 and a second embodiment of which is shown in FIGS. 4 and 5 and each of which incorporates features of the present invention, is used to mechanically lock a suspension system 22, 22a on a conventional van-type trailer 24 in a desired position when the van is first moved against a loading dock and parked. Like elements or parts in each embodiment are denoted with like reference numerals, with the second embodiment including a subscript "a" after the reference numeral.

The structure of the van-type trailer 24 is well-known. Generally, the van 24 includes a frame 26 and wheel axles 28 supported below the frame 26 on each side of the trailer 24 for carrying tires 30. A conventional brake 32 is supplied on each wheel axle 28. The wheel axle 28 is supported in and can rotate freely in a U-shaped channel 34. The U-shaped channel 34 is supported by suitable means, for example bolts 38, at generally the end of a cantilevered lever or arm 36. The opposite end of the cantilevered arm 36 is rotatable about a fixed pivot 40, such as a bolt or a pin, which is attached to the van frame 26. Other conventional suspensions may also be used to support the wheel axle 28.

An air bag 42 is located between the van frame 26 and the wheel axle 28 to permit a spring action so that relative up-and-down movement is permitted between the axle 28 and the frame 28 during transportation of the van 24. Specifically, the air bag 42 is attached to the underside of the frame 26 and to the top of the cantilevered arm 36 by known, suitable means. The air bag 42 is of a conventional structure. The air bag 42 is made of a flexible material which can expand or compress. A tank (not shown) of compressed air is provided on the van frame 24 and a valve (not shown) is connected between the tank and the air bag 42 so as to adjust the pressure in the air bag 42 for supporting the weight of the van 24 and its load and more specifically, for substantially maintaining a predetermined spacing between the van frame 26 and the axle 28, at least when the van 24 is stationary or not subjected to road shocks. While an air bag suspension is shown, it is to be understood that other suspensions and spring means of known construction may be used for permitting the relative up-and-down movement, such as a spring suspension.

Conventional suspension systems as well as the embodiment of the suspension system 20 used with the first embodiment of the locking mechanism 20 shown in FIGS. 1–3 include a conventional vehicle shock absorber 44 for damping out the relative up-and-down movement between the van frame 26 and the wheel axle 28 permitted by the air bag 42. The shock absorber 28 has a first end connected by a pivot 46, such as a pin or bolt, to a plate 48 which is affixed to the van frame 26. The second end of the shock absorber 44 is connected to the wheel axle 28 and the cantilevered arm 36 at a pivot 50, such as a pin. The structure of shock absorbers is well-known and is not described in detail herein. A latch member 52 is provided on the cantilevered arm 36 at a position which generally aligns with the second end of the shock absorber 44 for reasons described herein.

Each embodiment of the locking mechanism 20, 20a of the present invention includes, in general, a rigid or stiff leg or strut of fixed length which is connected between the cantilevered arm 36 and the van frame 26 so as to prevent the air bag 42 from either expanding or collapsing. When the van 24 is being driven, the locking mechanism 20, 20a is disengaged. Thus, relative up-and-down movement is permitted between the wheel axle 28 and the van frame 26. When the van 24 is parked, the locking mechanism 20, 20a is engaged or extended and relative up-and-down movement between the wheel axle 28 and the van frame 26 is prevented since the rigid strut fixes the distance between the wheel axle 28 and the frame 26. Thus, when a fork-lift truck enters into the trailer 24 or moves about in the trailer 24, the air bag 42 cannot deflate and inflate. This prevents the aforedescribed problems.

In the first embodiment of the locking mechanism 20 shown in FIGS. 1–3, the fixed length, stiff strut is an elongate member 56 with a first end 57 and a second, hook-shaped end 58. A member 56 is provided for each wheel axle 28 on each side of the trailer 24. As shown in FIG. 1, at generally the first end 57, each member 56 is affixed to a common shaft 60 which extends between the members 56. The ends of the shaft 60 are connected to the van frame 26 by a plate 62. The shaft 60 is rotatable with respect to the plate 62 and thus, the van frame 26. The hook-shaped end 58 is adapted to engage the latch member 52 on each cantilevered arm 36. In addition, an abutment end or end surface 59 of the end portion 58 is engagable with a complimentary abutment surface 61 on the axle support or arm 36. Each member 56 is rotatable with the shaft 60 and with respect to the van frame 24.

Each member 56 can be moved to a retracted position, as shown in FIG. 2, in which the vehicle frame 26 and the axle 28 are able to move in a relative up-and-down movement during transportation of the van 24 since the strut or member 56 does not fix the spacing between the van frame 26 and the wheel axle 28. In the retracted position, the vehicle shock absorber 44 and the air bag 42 are not locked and are able to compress or expand.

Each strut or member 56 can be rotated to an extended or engaged position when the van is parked, as shown in FIG. 3 and by means as described hereinbelow, with the hook-shaped end 58 of each member 56 engaging its respective latch member 52 on its respective cantilevered arm 36. When the member 56 is in an extended or engaged position with the latch 52 and the abutment 61, the frame 26 and the axle 28 are locked relative to each other and are unable to move in a relative up-and-down movement since the member 56 fixes the distance between the frame 26 and the axle 28. The shock absorber 44 and the air bag or other spring means 42 cannot collapse or expand and thus relative movement between the axle 28 and the van frame 26 is prevented.

Normally, as shown in FIG. 3, the hook-shaped end 58 of each member 56 is in an engaged position with its respective latch member 52 on the cantilevered arm 36. The members 56 are normally kept engaged by a coiled, tension spring 64 which is attached to the first end 57 of one of the rigid members 56. To retract the members 56, as shown in FIG. 2, an air cylinder 66 and an associated piston arm member 68 are provided. The piston arm member 68 is connected between the air cylinder 66 and to the first end 57 of the same member 56 to which the tension spring 64 is attached by a connecting member 70. The air cylinder 66 moves the arm member 68 to an engaged or extended position when air is supplied to the cylinder 66 by suitable means, for example, by the air brake during operation of the van 24. When the arm member 68 is extended, the spring 64 is overpowered. This action moves the member 56 to which the arm member 68 is attached to a retracted position. By way of the common shaft 60, the member 56 on the opposite side of the trailer 24 also retracts.

While the above structure is described with the tension spring 64 biasing the strut or member 56 into an extended or engaged position and the air cylinder 66 and piston arm member 68 moving the member 56 into a retracted position, one of ordinary skill in the art could modify the illustrated invention so that the tension spring biases the strut into a retracted position while the air cylinder biases the strut into an extended or engaged position. Furthermore, while the tension spring, the air cylinder and its associated piston arm member are described hereinabove as being connected to only a single strut, it is envisioned that each strut could have this structure attached thereto.

In the second embodiment of the locking mechanism 20a, shown in FIGS. 4 and 5, the strut is provided by a double-acting hydraulic cylinder 72. The hydraulic cylinder replaces the vehicle shock absorber 44 shown in FIGS. 1–3, and the hook-ended members 56, shaft 60, spring 64, air cylinder 66 and its associated structure and latch member 52 of the first embodiment are eliminated. The remaining structure of the air suspension 20a is the identical to that described with respect to the first embodiment. A hydraulic cylinder 72 with the associated belowdescribed structure is provided on each wheel of the trailer 24.

The hydraulic cylinder 72 has a first end connected to the vehicle frame 26 by a pivot 46a, such as a pin or bolt. The second end of the cylinder 72 is connected to the wheel axle 28 and the cantilevered arm 36 at a pivot 50a, such as a pin. The cylinder 72 includes a piston 74 therein to form a top chamber 76 and a bottom chamber 78 for the oil in the cylinder 72. Conventional hydraulic cylinders of a shock absorber have an orifice through the piston to allow for the oil to move through the piston from one chamber to the other to permit dampening. In the cylinder 72 of the present invention, this orifice has been eliminated.

Instead, suitable connection members or hydraulic lines 80, 82, such as hoses, extend from orifices 84, 86 which are generally at each end of the cylinder 72 to a valve 88 which is external to the cylinder 72. The valve 88 includes a housing 90 having aligned orifices 92, 94 thereon. A plunger 96 is housed within the housing 90. Each connection member 80, 82 is attached to an orifice 92, 94, respectively, on the housing 90. The plunger 96 has a passageway 98 therethrough to allow for sufficient communication between the opposite ends of the hydraulic cylinder 72 to obtain the desired shock-absorbing, damping function by allowing the hydraulic fluid to pass from one chamber, for example 76, through the passageway 98 in the valve 88 to the other chamber 78 in the cylinder 72. The valve 88 can be mounted on a suitable pivot (not shown), to allow the valve 88 to move with the cylinder 92.

The plunger 96 is normally biased in a closed position by a coiled, uncompressed spring 100 at one end of the plunger 96 to completely block the opposite ends of the cylinder 72 by positioning the passageway 98 out of line with the connection member orifices 92, 94. Thus, the hydraulic fluid is locked in the chambers 76, 78, the cylinder 72 becomes a rigid strut which cannot extend and retract. When the cylinder 72 is rigid, the distance between the vehicle frame 26 and the wheel axle 28 is fixed by the rigid cylinder 72 and relative up-and-down movement between the frame 26 and the axle 28 is prevented.

To permit relative up-and-down movement between the wheel axle 28 and the frame 26 during transportation of the van 24, the valve 88 must be moved to an open position which allows the cylinder 72 to extend and retract. A suitable air supply 102, such as air from the brakes, is connected to the valve 88 by suitable means, such as a hose 104 for moving the plunger 96 to an open position. When air is supplied from the air supply 102, through hose 104 and into the housing 90, the air pushes the plunger 96 thereby compressing the spring 100 and moving the passageway 98 into alignment with the orifices 92, 94. When the passageway 98 is aligned with the orifices 92, 94, the hydraulic fluid can pass through the valve 88. When this occurs, the cylinder 92 is no longer a rigid strut and the van frame 26 and the axle 28 can move up-and-down relative to each other.

While the above structure is described with the spring 100 biasing the valve 88 into a closed position which blocks communication between the chambers 76, 78 and the air supply 102 biasing the valve 88 into an open position where the chambers 76, 78 can communicate with each other, one of ordinary skill in the art could modify the illustrated invention so that the spring biases the valve into a open position while the air supply biases the valve into a closed position.

While preferred embodiments of the present invention are shown and described, it is envisioned that those skilled in the art may devise various modifications of the present invention without departing from the spirit and scope of the appended claims. The invention is not intended to be limited by the foregoing disclosure.

The invention claimed is:

1. A suspension system for a vehicle, said vehicle having a frame and at least one ground-engaging wheel which is engaged with the ground, said suspension system comprising a wheel axle supported for up-and-down movement relative to the frame, said wheel axle supporting said at least one ground-engaging wheel; spring means for permitting relative up-and-down movement between the axle and the frame during transportation of the vehicle; and a locking member of fixed length said locking member being shiftable from an extended position wherein said locking member is operatively engaged between said frame and said axle when the vehicle is parked such that said frame and said axle are locked and are unable to move in a relative up-and-down movement, said at least one ground-engaging wheel being engaged with the ground when said vehicle is parked said locking member further being shiftable to a retracted position wherein said locking member is not operatively engaged between said frame and said axle such that said frame and said axle are movable in a relative up-and-down movement during transportation of the vehicle said at least one ground-engaging wheel being engaged with the ground during transportation of the vehicle.

2. A suspension system as defined in claim 1, wherein said spring means for permitting relative up-and-down movement between the axle and the frame during transportation of the vehicle comprises an air bag.

3. A suspension system as defined in claim 1, further including means for moving said member to the extended position and means for moving said locking member to the retracted position.

4. A suspension system as defined in claim 3, wherein said means for moving said locking member to the extended position comprises a spring having an end connected to said locking member, an opposite end of said spring being connected to said vehicle frame.

5. A suspension system as defined in claim 3, wherein said means for moving said locking member to the retracted position comprises an air cylinder, an arm member connected to said air cylinder and said locking member, said air cylinder moving said arm member to an extended position to move said locking member to said retracted position.

6. A suspension system as defined in claim 3, wherein said means for moving said locking member to the extended position comprises a spring having an end connected to said locking member, an opposite end of said spring being connected to said vehicle frame; and said means for moving said locking member to the retracted position comprises an air cylinder, an arm member connected to said air cylinder and said locking member, said air cylinder moving said arm member to an extended position to overcome the spring and move said locking member to the retracted position.

7. A suspension system as defined in claim 1, further including a latch member interconnected with said axle and wherein said locking member comprises a hook which engages with said latch member when said locking member is in the extended position.

8. A mechanism for mechanically locking a suspension system on a vehicle, said vehicle having a frame and at least one ground-engaging wheel which is engaged with the ground, said suspension system including a wheel axle supported on a cantilevered arm, said wheel axle supporting said at least one ground-engaging wheel, said arm being rotatable about a pivot on said frame, means for permitting relative up-and-down movement between the axle and the frame during transportation of said vehicle; said mechanism comprising a locking member of fixed length, said locking member being shiftable from an extended position wherein said locking member is engaged between said frame and said cantilevered arm when the vehicle is parked such that said frame and said cantilevered arm are locked and are unable to move in a relative up-and-down movement, said at least one ground-engaging wheel being engaged with the ground when said vehicle is parked, said locking member further being shiftable to a retracted position wherein said locking member is not engaged between said frame and said cantilevered arm such that said frame and said cantilevered arm are movable in a relative up-and-down movement during transportation of the vehicle, said at least one ground-engaging wheel being engaged with the ground during transportation of the vehicle.

9. A mechanism as defined in claim 8, wherein said locking member has a first end attached to the vehicle frame and a second end having means for engaging the cantilevered arm.

10. A mechanism as defined in claim 9, further including means for moving said locking member to the engaged position with said cantilevered arm and means for moving said locking member to the retracted position.

11. A mechanism as defined in claim 10, wherein said means for moving said locking member to the engaged position with said cantilevered arm comprises a spring having an end connected to said locking member, the other end of said spring being connected to said vehicle frame; said means for moving said locking member to the retracted position comprising an air cylinder, an arm member connected to said air cylinder and said locking member, said air cylinder moving said arm member to an extended position to move said locking member to said retracted position.

12. A mechanism as defined in claim 9, and further including a latch member on said cantilevered arm, and wherein said means for engaging the cantilevered arm on said locking member comprises a hook on said locking member which engages with said latch member when said locking member is in said extended position.

* * * * *

UNITED STATES PATENT AND TRADEMARK OFFICE
CERTIFICATE OF CORRECTION

PATENT NO. : 5,536,036
DATED : July 16, 1996
INVENTOR(S) : Rodney P. Ehrlich

It is certified that error appears in the above-indentified patent and that said Letters Patent is hereby corrected as shown below:

Column 7 line 42 "said member" should read -- said locking member --

Signed and Sealed this

Twenty-fourth Day of December, 1996

Attest:

BRUCE LEHMAN

*Attesting Officer*  *Commissioner of Patents and Trademarks*